United States Patent [19]
Lea

[11] Patent Number: 4,656,622
[45] Date of Patent: Apr. 7, 1987

[54] MULTIPLE PATHS IN A SELF-ROUTING PACKET AND CIRCUIT SWITCHING NETWORK

[75] Inventor: Chin-Tau A. Lea, Lisle, Ill.

[73] Assignee: American Telephone and Telegraph Company, Murray Hill, N.J.

[21] Appl. No.: 654,765

[22] Filed: Sep. 26, 1984

[51] Int. Cl.$^4$ .......................................... H04Q 11/04
[52] U.S. Cl. .......................................... 370/60; 370/16
[58] Field of Search ........................ 370/16, 60, 94, 54

[56] References Cited

U.S. PATENT DOCUMENTS

| | | | |
|---|---|---|---|
| 4,201,891 | 5/1980 | Lawrence et al. | 370/58 |
| 4,408,323 | 10/1983 | Montgomery | 370/60 |
| 4,445,213 | 4/1984 | Baugh et al. | 370/60 |
| 4,494,231 | 1/1985 | Slawy et al. | 370/60 |
| 4,512,011 | 4/1985 | Turner et al. | 370/60 |
| 4,539,676 | 9/1985 | Lucas | 370/94 |
| 4,550,397 | 10/1985 | Turner et al. | 370/60 |

FOREIGN PATENT DOCUMENTS 58-150349  9/1983  Japan .

OTHER PUBLICATIONS

*Proc. of the Sixth International Conf. on Computer Communication,* London, Sep. 7-10, 1982, North-Holland Pub. Co. (Amsterdam, NL) M. Romagnoli, et al., "ISDN Capabilities in a Digital Local Exchange", pp. 37-42.
*IEEE Transactions on Computers,* vol. C-31, No. 5, May, 1982, New York (US) G. B. Adams, III, et al., "The Extra Stage Cube: A Fault-Tolerant Interconnection Network for Supersystems", pp. 443-454.
*IEEE Transactions on Computers,* vol. C-27, No. 10, Oct. 1979, New York (US) A. Hopper, et al., "Binary Routing Networks", pp. 669-703.
P. C. Richards, "Technological Evolution-The Making of a Survivable Switching System", 3rd *World Telecommunication Forum* 1979, pp. 1.2.6.1-1.2.6.8.
*IEEE Transactions on Computers,* vol. C-28, No. 10, Oct., 1979, New York (US) A. Hopper, et al., "Binary Routing Networks", pp. 669-703.
*International Switching Symposium,* Montreal, Sep. 21-25, 1981 IEEE (New York, US) G. R. D. Alles, et al., "An Experimental Digital Switch for Data and Voice", Session 21B, paper 3, pp. 1-7.
*International Switching Symposium,* Montreal, Sep. 21-25, 1981, IEEE (New York, US) N. Corsi, et al., "Design and Performance of Subscriber Access Equipment for Packet Switched Networks", Session 32C, paper 4, pp. 1-7.

*Primary Examiner*—Douglas W. Olms
*Assistant Examiner*—Kenneth I. Rokoff
*Attorney, Agent, or Firm*—John C. Moron

[57] ABSTRACT

A communication method and self-routing switching network interconnecting a plurality of interface controllers for communicating packets and circuit switched information via multiple paths within the self-routing switching network. The latter comprises stages of switch nodes that are grouped into pairs. The stages are interconnected by links and each pair of switch nodes shares the same set of input links from the preceding stage. In response to receipt of address information from a destination interface controller transmitted via a link, a pair of nodes determines one of a multitude of paths through the switching network by one of the pair responding to the address information to communicate the address information to the next sequential stage after establishing a path through that particular switch node. Once a path has been established through the switching network, an acknowledge signal is transmitted back through the network to the destination trunk controller indicating that the path has been established. The path remains established until the end field of the packet is detected or the proper end information is transmitted after transmission of the circuit switched information. The architecture of the switching network is such that no additional switch nodes are required beyond what would be required in a conventional self-routing network.

18 Claims, 11 Drawing Figures

LINK CONTROL 500

| FIG. 6 | FIG. 7 |

MULTIPLE PATHS IN A SELF-ROUTING PACKET AND CIRCUIT SWITCHING NETWORK

CROSS-REFERENCE TO RELATED APPLICATION

Concurrently filed herewith and assigned to the same assignee as this application are:

C. A. Lea and W. A. Montgomery, "A Self-Routing Packet Switching Networ With Intrastage Packet Communication," Ser. No. 654-763; and C. A. Lea, "An Alternate Self-Routing Packet Switching Node Having Fault Detection Capabilities," Ser. No. 654-764.

TECHNICAL FIELD

This invention relates to a method and switching architecture for the switching of packets and circuit switched information. The invention specifically pertains to a switching architecture having switching stages each containing self-routing switching nodes responsive to the transmission of address information and the availability of paths within the switching network to select one of a multitude of paths for the communication of circuit switched information and packets through the switching network.

BACKGROUND OF THE INVENTION

Self-routing packet switching networks such as those using unbuffered banyan switching nodes communicate packets through the switching network on the basis of address information transmitted through the switching network prior to the transmission of the packet. Such a switching network has only one unique path between each input and output pair of the network and is illustrated in FIG. 1. Since circuit switching requires a path to remain setup for an indefinite period of time, information cannot be readily circuit switched through a prior art banyan network because a large portion of the paths would become blocked. Furthermore, such prior art networks were constrained by network protocol requirements to the communication of packets. Whereas packet switching is capable of communicating voice and low to medium bandwidth data, wide band data, such as video information, must be circuit switched. In order to provide the new types of data and voice services that have been proposed, it is desirable to have a switching system that can provide both packet and circuit switching.

Another problem with the existence of only one unique route is the effect of unbalanced traffic conditions on the network. The problems due to unbalanced traffic are a result of the architecture of the basic banyan switching network. From FIG. 1, it can be seen that the network architecture is such that the first stage of the network is responsive to the address information to direct the packet to one-half of the network, sections 2 and 3, and that the second stage of network then directs the packet to sections 4 through 7 of the third stage with each of these sections representing a quarter of the network. The fourth, fifth, and sixth stages are responsive to the packet from the third stage to properly route the packet to the proper output conductor. Under certain unbalanced traffic conditions, the basic architecture of the banyan switching network results in concentrations of packets in certain nodes in the third stage.

The following example illustrates the effect of unbalanced traffic conditions in the third stage. Consider the example where packets from conductors 200-0, 200-1, 200-16, 200-17, 200-32, 200-33, 200-48, and 200-49 are transferring packets to conductors 206-0 through 206-7. All packets from these input conductors must be switched through node 102-0 via the following paths. The communication path from 200-0 and 200-1 to output conductors 206-1 through 206-7 is through node 102-0 of stage 3 via the path of links 201-0 and 202-0; a path from input conductors 200-16 and 200-17 to output conductors 206-1 and 206-7 is via links 201-16 and 202-16 via node 102-0; the path from input conductors 200-32 and 200-33 to output conductors 206-1 through 206-7 is via links 201-32 and 202-0 through node 102-0; and similarly the path from input conductor 200-48 and 200-49 t the output conductors is via link 201-48 and 202-16 via node 102-0. The path from node 102-0 to the previously mentioned output conductors is via links 203-0, 204-0 or 204-1, 205-0 and 205-1, 205-4 or 205-5. It can be seen that the traffic capacity of the network for this example is limited to the traffic capacity of node 102-0.

In addition, if node 102-0 fails, there is no way to establish communication paths between the previously mentioned input conductors and the previously mentioned output conductors.

One known method for alleviating the reliability and traffic problems in a self-routing network is discussed in the report entitled, "Development of a Voice Funnel System", Bolt, Beranek and Newman, Inc., Report No. 4098, August, 1979, pages III-29 through III-76, which discloses the use of an extra stage of banyan switching nodes at the input of a self-routing network to resolve the previously mentioned problems of traffic unbalance and reliability. The report proposes that this extra stage of switching be identical to other stages of the network and be utilized by adding an extra bit of addressing to the address field of each packet being routed through the switching network. This extra stage of switching would precede stage 1 of FIG. 1. The extra address bit would be controlled by hardware or software external to the switching network and would determine the route through the switching network. The hardware or software would use this bit so as to avoid a node which was failing or experiencing heavy traffic.

Whereas the method proposed by the report allows the addition of more than one unique route through the switching network, it requires that an additional stage be added to the network and that the decision of which route to use be made external to the network. In addition, the network described in this report can only be used to switch packets.

SUMMARY OF THE INVENTION

The aforementioned problems are solved and a technical advance is achieved in accordance with the principles of this invention incorporated in an illustrative method and switching network architecture that allows simultaneous packet and circuit switching by providing multiple paths through a self-routing switching network between any two given input and output terminals without requiring the addition of any more switch nodes than prior art self-routing networks or the use of external control methods. The effects of traffic unbalance and failing switch nodes within the network are reduced since multiple paths exist.

Advantageously, the switching network has a plurality of stage each comprising interconnected switch nodes. Each of the switch nodes of one stage is interconnected to switch nodes in the next sequential stage. A given set of switch nodes of one stage is interconnected to particular set of switch nodes in the preceding stage via links, and each switch node of this set is capable of responding to address information transmitted from a preceding switch node via any link to set up a path to the next sequential stage. Since more than one switch node of a given stage can respond to address information from a preceding stage to set up a path, there exists a multitude of paths through the switching network.

Advantageously, the path is released upon receipt of a set of end flag signals contained within the data of either the packet or the circuit switched information.

In addition, each of the switch nodes in response to receipt of address signals designates one of the switch nodes of the set in the next sequential stage for receiving the address information, and each switch node is further responsive to a communication unavailable signal from the designated node of the set of the next sequential stage to enter an idle state. In addition, the switch node is responsive to the communication unavailable signal to transmit a communication unavailable signal to the preceding stage.

Also, if the switch node does not receive back a communication unavailable signal from the next sequential stage, it transmits to the switch nodes in its set an input link busy signal to indicate to the other switch nodes of the set that this particular link is under active use and that the other switch nodes should not respond to any packet or circuit switched information being transmitted on this particular link.

Advantageously, a set of switch nodes within a particular stage consists of a pair of switch nodes that are paired in the following manner. Each node of the pair is represented by binary number which defines its position within the stage. Given the position of one node of the pair, the other node of that pair is defined by complementing bit positions of the binary number of the given node position. Specifically, the other node position is defined by complementing the bit position of the given number equal to the stage number where the stage number is less than or equal to half the total number of stages in the network and by complementing the least significant bit position of the given number where the stage number is greater than half of the total number of stages. Another specific way of defining the position of the pair of switch nodes is as follows. Given the node position of a first node of the pair, the second node of the pair is defined by complementing the bit position of the second node's binary number which is equal to half the number of total stages minus the stage number plus 1 when the stage number is less than or equal to half the total number of stages and by complementing the least significant bit position when the stage number is greater than half the total number of stages.

The illustrated method involves the steps of transmitting routing information on one of a set of links interconnecting two stages, selecting one of a multitude of paths by one of a set of switch nodes connected to that particular link responding to the address information to transfer the address routing information to another set of switch nodes in the next sequential stage and to establish the path through the responding one of switch nodes. In addition, the steps further include the transmission of end signals by a distributed controller at the end of circuit switched information via an established path and disabling the path in each of the switching nodes upon receipt of these end signals. Advantageously, in order to assure that only one switch node in a given stage is responsive to information of a given packet or circuit switched information path, a switching node, after receiving and responding to the address routing information, transmits an input link busy signal to the other switch nodes of the responding node's set. The other switch nodes enter the idle state upon receipt of the input link busy signal with respect to that path.

These and other advantages and features of the present invention will become apparent from the following description of an illustrative embodiment of the invention taken together with the drawing.

DETAILED DESCRIPTION

Figure 1:
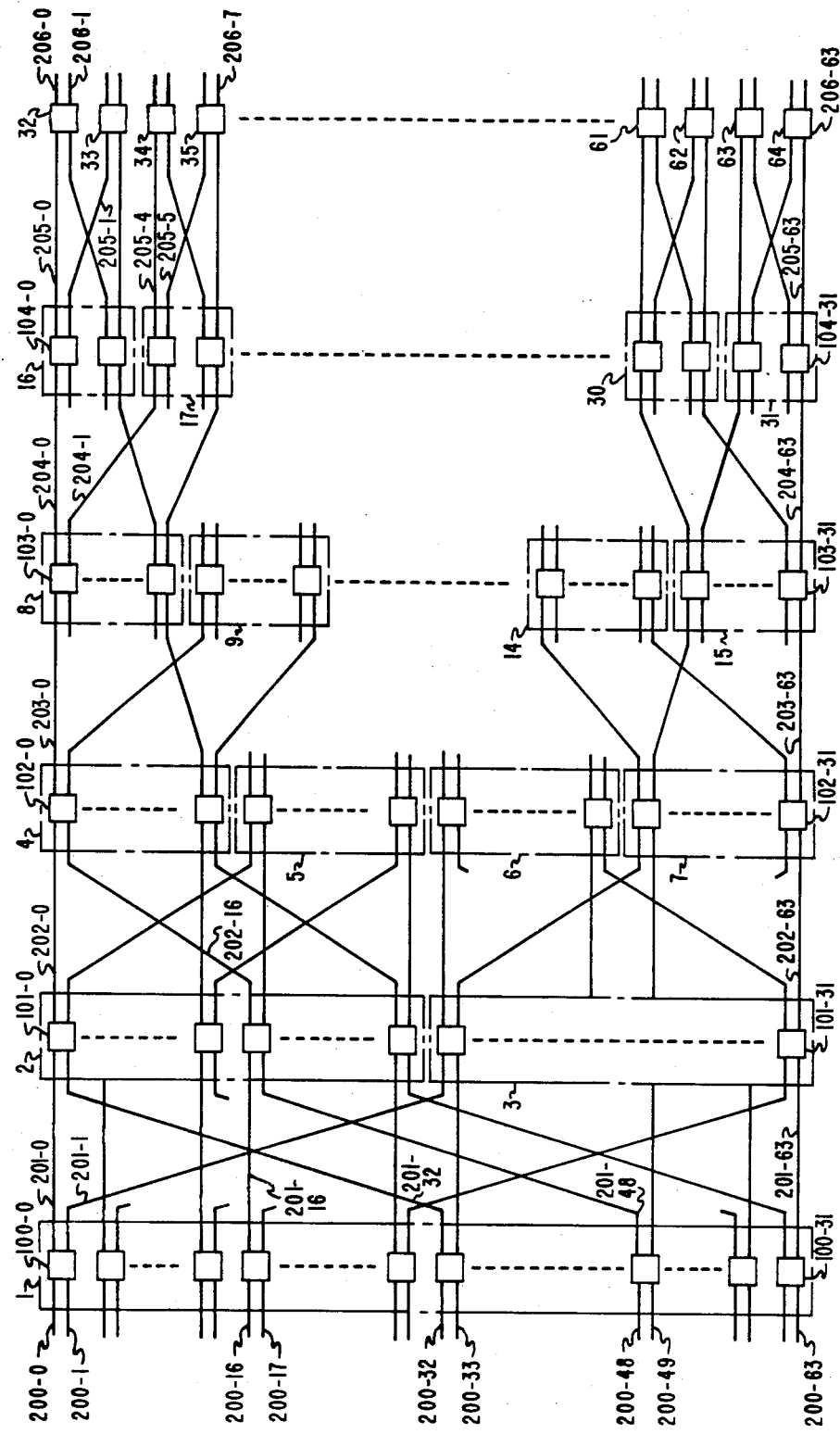
FIG. 1 illustrates, in block diagram form, a prior art self-routing packet switching network.
Figure 2:
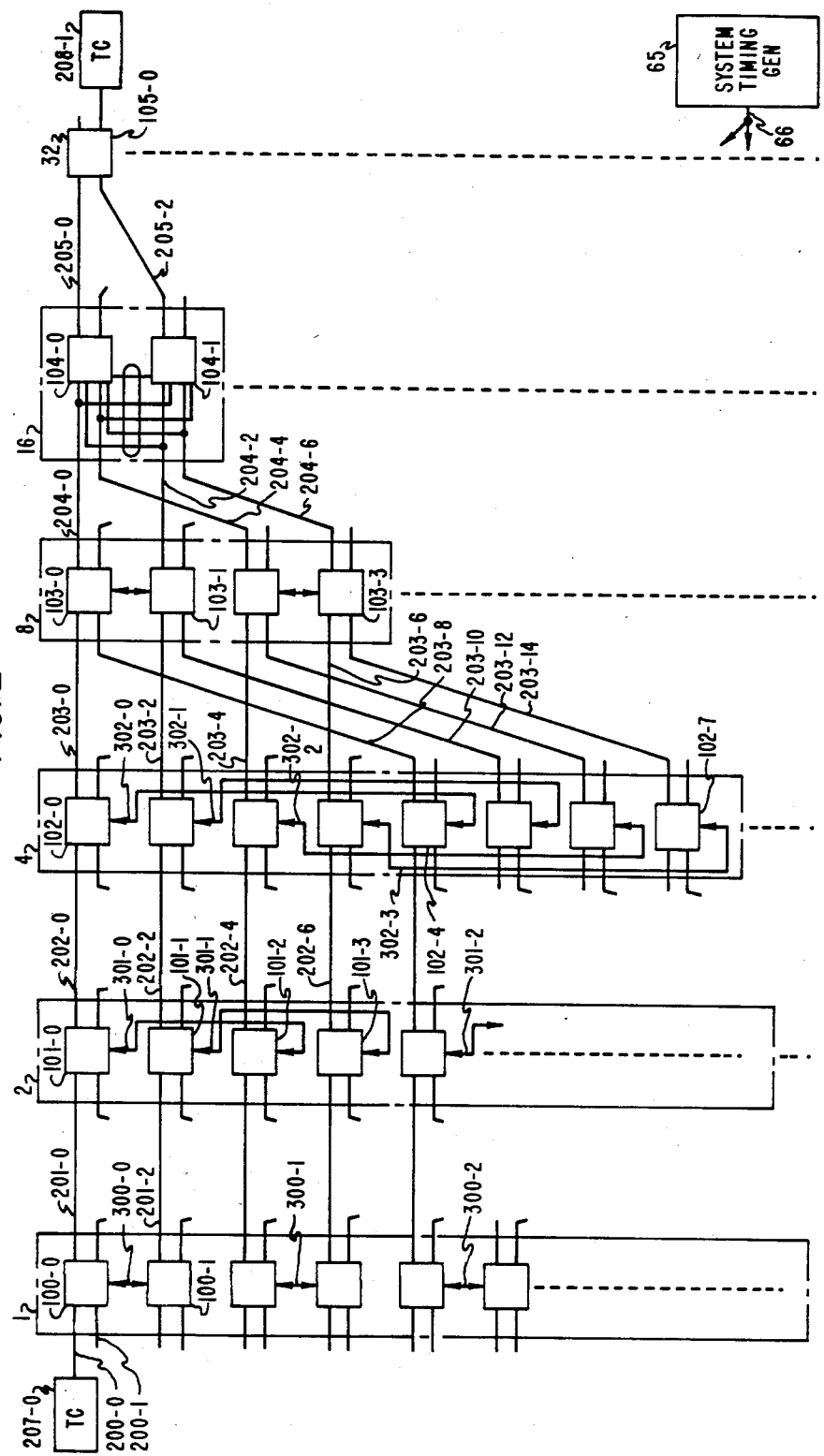
FIG. 2 illustrates, in block diagram form, a packet switching network which is the subject matter of this invention.

FIG. 2 shows an illustrative packet switching network which is the focus of this invention. The interconnections within a section of a particular stage, such as section 3 of stage 3, are representative of all interconnections within all sections of that particular stage. The manner in which an interconnection between two nodes of a pair is illustrated in greater detail for nodes 104-0 and 104-1. For ease of understanding, all numerical designations exclusive of those in the 300 series define interconnection and switching node positions which are identical to those of FIG. 1. Only the links which transfer packets between trunk controller 207-0 to trunk controller 208-1 are illustrated in FIG. 2. Within each stage of FIG. 2 with the exception of stage 6, each switching node is paired with another switching node such that a packet received on one of the inputs of a pair of nodes can be transferred from any of the four outputs associated with that pair of switching nodes.

The path through the switching network of FIG. 2 is set up by trunk controller 207-0 transmitting address information through the network prior to the transmission of data information. This address information is used by each pair of switching nodes within a given stage to determine which two of the four outputs associated with that pair of switching nodes can be used in the communication of the packet to the subsequent stage. If both of the outputs are idle, then a predetermined one of the outputs is utilized; however, if only one output is available then that output is used to communicate the packet to the subsequent stage. Once a path has been set up through the switching network, the path remains set up until an end flag is detected in the data information by each node in the path. Since the path remains set up until the end flag is received, the network can be used for both packet and circuit switched transmission.

The method used for pairing the switching nodes together as illustrated in FIG. 2 is defined as follows. Let $$[P_{m-1} \ldots P_2 P_1]_i^n$$

(where m equals the number of stages in the network, n equals the node number, and i equals the stage number) be the binary representation of node n's position within stage "i". Each "P" represents one binary bit. Also, let $$[P_{m-1} \ldots P_2 P_1 P_0]_i^l$$

be the binary representation of link "1" to the node in stage "i". The binary representation of the partner of a node $$[P_{m-1} \ldots P_i P_1]_i^n$$

is $$[P_{m-1} \ldots \bar{P}_i \ldots P_1]_i^n$$

where $i \leq m/2$ and is $$[P_{m-1} \ldots P_i \ldots \bar{P}_1]_i^n$$

where $i > m/2$.

For example, switching noe 103-0 in state 3 is represented by $$[00000]_3^0$$

and its partner is $$[00\bar{0}00]_3^4$$

which can also be written as $$[00100]_3^4$$

Another method for pairing the switching nodes together is defined as follows. Let the node n's position and the link number be defined as previously described. The binary representation of the partner of a node $$|P_{m-1} \ldots P_i P_1|_i^n$$

is $$P_{m-1} \ldots \bar{P}_{(\frac{m}{2}-i+1)} \ldots P_1]_i^n$$

where $i \leq m/2$ and is $$|P_{m-1} \ldots P_i \ldots \bar{P}_1|_i^n$$

where $i > m/2$.

Figure 4:
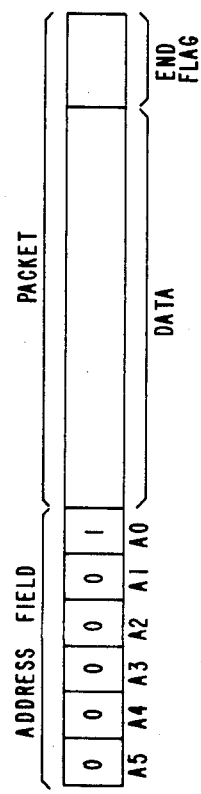
FIG. 4 illustrates information transmitted by a trunk controller during the setup and routing of a packet through the switching network illustrated in FIG. 2.

To illustrate the overall function of the packet switching network illustrated in FIG. 2 consider the routing of the packet illustrated in FIG. 4 from trunk controller 207-0 to trunk controller 208-1. The links illustrated in FIG. 2 are all of the available paths that can be utilized for switching the packet illustrated in FIG. 4 to trunk controller 208-1. The path is set up through the switching network by trunk controller 207-0 first transmitting the address field of the packet illustrated in FIG. 4 and a setup signal during path setup time to the switching network via input link 200-0. The path setup time is determined by system timing generator 65. Each switching node upon receipt of the address information and the setup signal deletes the most significant bit of address information that it receives. For example, a switching node in stage 1 receives all six address bits, A0–A5, and deletes the A5 bit and then, retransmits to the second stage bits A0 through A4 and the setup signal. This process continues until the address field and setup signal reach stage 6 where a switching node receives only the A0 bit.

Consider now, in greater detail, the determination of the path between trunk controller 207-0 to trunk controller 208-1. Switching node 100-0 is responsive to address information on input link 200-0 to transfer this information and the setup signal to either node 101-0 via link 201-0 or to node 101-1 via cable 300-0, node 100-1, and link 201-2. Node 100-0 performs this transfer operation in response to the address information by directly interrogating whether or not link 201-0 is idle and also by interrogating whether or not link 201-2 is idle via node 100-1 and cable 300-0. If the address information and setup signal reach node 101-0 of section 2 of stage 2 via link 201-0, it can then be communicated to section 4 of stage 3 via either node 101-0 or node 101-2 via cable 301-0. Similarly, if the address information and setup signal are conveyed to section 2 via link 201-2, then switching node 101-1 or switching node 101-3 can be used to communicate the address information and setup signal to section 4 of stage 3.

Once, the node in section 2 of stage 2 is designated for transferring the address information that node enters a wait state awaiting confirmation that a path has been completed to trunk controller 208-1. Upon receipt of this confirmation, the node enters a busy state and transfers the subsequent data information of the packet to the selected output link until the end flag is detected in the packet. Once this occurs, the node enters the idle state.

The previous discussion illustrates that there are four links available for transferring the address information and setup signal and the remainder of the packet between stage 2 and stage 3 of FIG. 2 versus only one link that is available in FIG. 1 when a packet is being transferred through the switching network from trunk controller 207-0 to trunk controller 208-1. Note, that the transfer of packets on the cables such as cable 300-0 is bidirectional such that packets can be transferred from switching node 100-1 to switching node 100-0 via cable 300-0 and vice versa.

From the previous discussion, it can be seen that the address information and setup signal can be transferred to section 4 of stage 3 via links 202-0, 202-2, 202-4, 202-6, the switching nodes 102-0 through 102-7 that comprise section 4 are responsive to the address information on one of the previously mentioned links to transfer the address information and setup signal to stage 4 via links 203-0, 203-2, 203-4, 203-6, 203-8, 203-10, 203-12, or 203-14. Once again, in comparison to FIG. 1, FIG. 2 at stage 3 has eight possible output links for transferring the address information and setup signal and the subsequent packet between trunk controller 207-0 to trunk controller 208-1 whereas FIG. 1 has only one link.

The remaining stages of FIG. 2, namely stages 4, 5, and 6 are concerned with routing the packet to the proper output conductor and because of this are simply paired with the adjacent switching node. Within stage 4, nodes 103-0 and 103-1 are responsive to the receipt of address information on links 203-0, 203-2, 203-8, or 203-10 for communicating the address information and setup signal to nodes 104-0 or 104-1 of stage 5 via links 204-0 and 204-4 or links 204-2 and 204-6, respectively. Nodes 104-0 and 104-1 are responsive to receipt of the address information to communicate the address information to node 105-1 via links 205-1 or 205-3. Node 105-0 is responsive to the address information to send the setup signal to trunk controller 208-1.

Trunk controller 208-1 is responsive to receipt of the setup signal from node 105-0 to transmit back an acknowledge signal to node 105-0. The latter is responsive to the acknowledge signal to retransmit the acknowledge signal to stage 5 via the link that had been previously selected during the path setup operation. The acknowledge signal then is rippled back to trunk controller 207-0 via the previously setup path. When the acknowledge signal is received by trunk controller 207-0, it commences transmission of the packet illustrated in FIG. 4. As each node in the path that has been selected receives an acknowledge signal from the preceding node, that node receiving the acknowledge signal enters a busy state locking the path through the network until the end flag is received in the packet data. If the node, while in the wait state, does not receive the acknowledge signal, it is forced into the idle state during the next path setup time by the path signal.

In general, it can be shown that for an "n" stage banyan network, the architecture illustrated in FIG. 2 provides at the middle stage $\sqrt{N}$ alternate output links. This additional number of alternate output links greatly reduces the problem of traffic unbalance.

Figure 5:
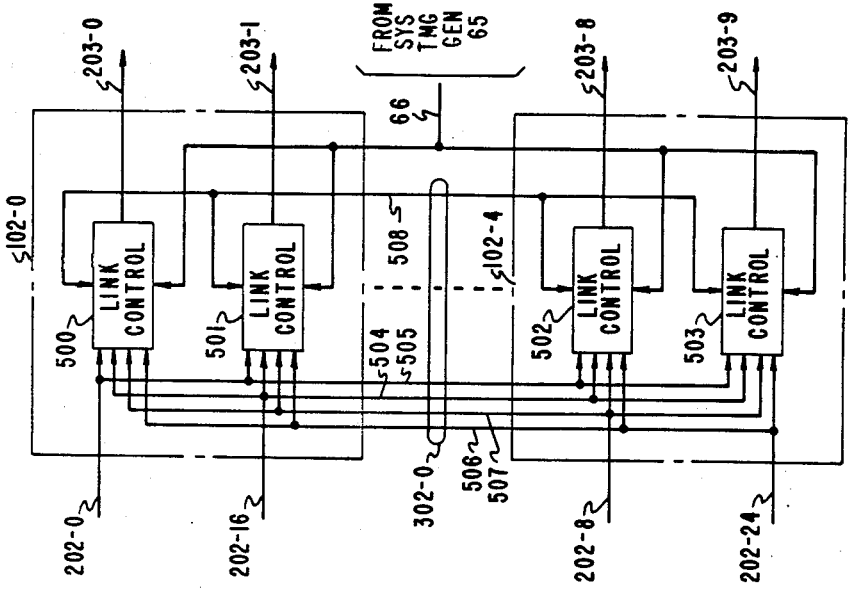
FIG. 5 is a detailed block diagram of switch node 102-0 of FIG. 2.

Nodes 102-0 and 102-4 are illustrated in greater detail in FIG. 5. Each node consists of two link control circuits such as link control circuit 500. Nodes 102-0 and 102-4 intercommunicate via cable 302-0 which comprises subcables 504 through 508. As described in greater detail in the discussion of FIG. 6 and FIG. 7 that illustrate link control 500, each link control circuit has four states: idle, setup, wait, and busy. When a link control circuit is in the idle state, it is responsive to the setup signal received via a link to enter the setup state. While in the setup state, link control circuits 500 through 503 monitor subcables 504 through 507 for the address information. If the most significant bit of the received address information is a "0", link control circuits 500 and 502 respond to the most significant bit being a "0" by establishing a path through either links 203-0 or 203-8, respectively. Conflicts are avoided since link control circuit 500 attempts to establish this communication path at a different point in time than link control 502 utilizing timing information that is received from system timing generator 65 via cable 66. If the most significant bit of the address information is a "1", link control circuits 501 and 503 attempt to establish a communication path through links 203-1 and 203-9, respectively; and if the most significant bit is a "0", link control circuits 502 and 500 attempt to establish a path through links 203-0 and 203-8. Whether or not a link control circuit can establish a path depends on whether or not the link connected to it is idle. If a link control circuit establishes the path, it then enters a wait state during which it continues to communicate the remaining address bits of the address information received via the subcable to the subsequent stages.

When the link control circuit receives an acknowledge signal back from the succeeding stage, it enters the busy state. If the link control does not receive the acknowledge signal before transmission of the next setup pulse indicating that no path was completed, the link control is placed in the idle state by the next setup signal. Once the link control circuit receives the acknowledge signal, it enters the busy state and remains in the busy state until the end flag is received.

The link control circuits also communicate information over subcable 508 indicating whether or not they currently have a path established for a given incoming link such as 202-0. The purpose of this information communicated over subcable 508 is to keep the other link control circuits from erroneously responding to packet data bits by interpreting them as address information and a setup signal.

Figure 6:
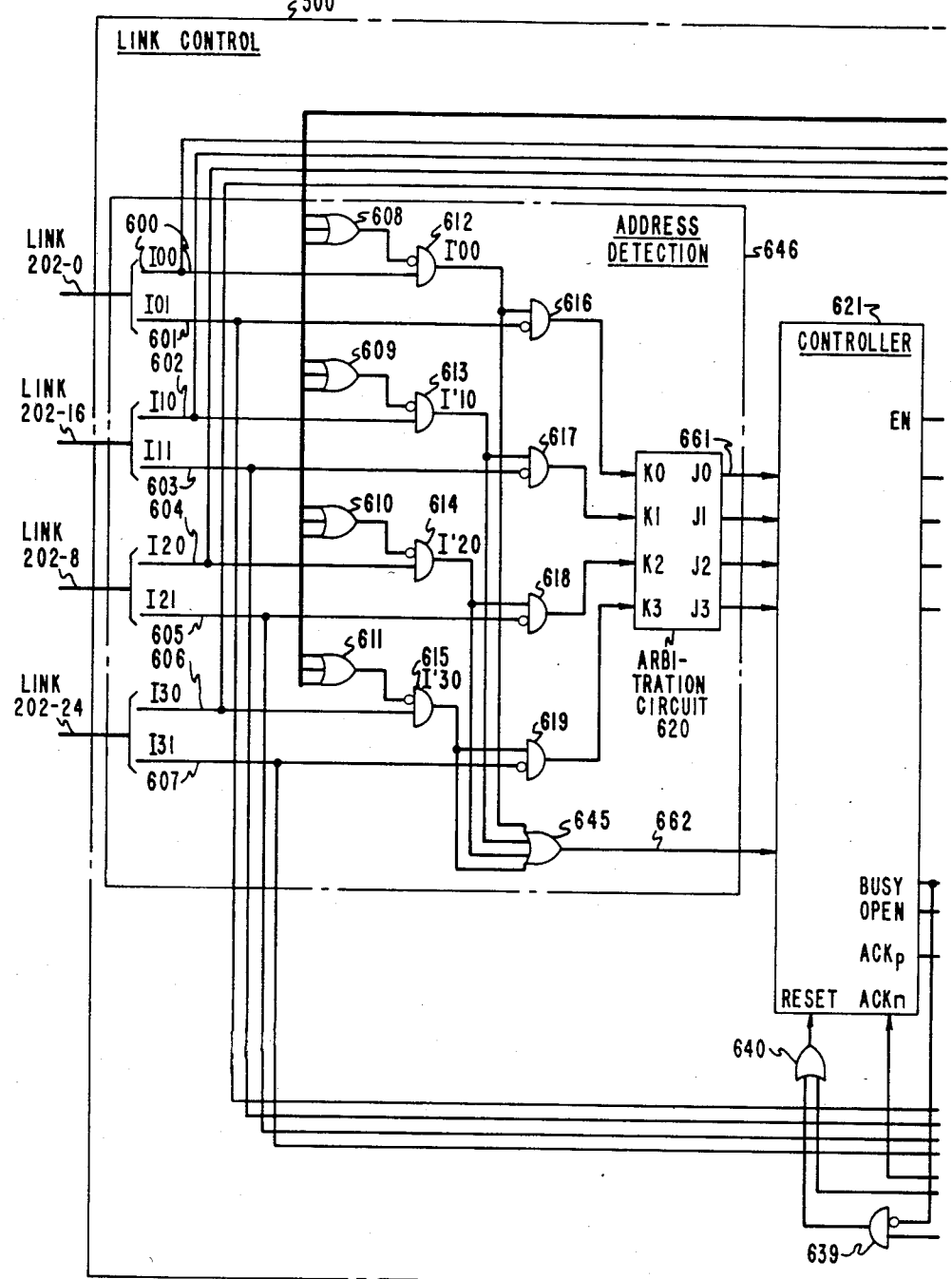
FIGS. 6 and 7 illustrate in greater detail link control 500 of switch node 102-0.
Figure 7:
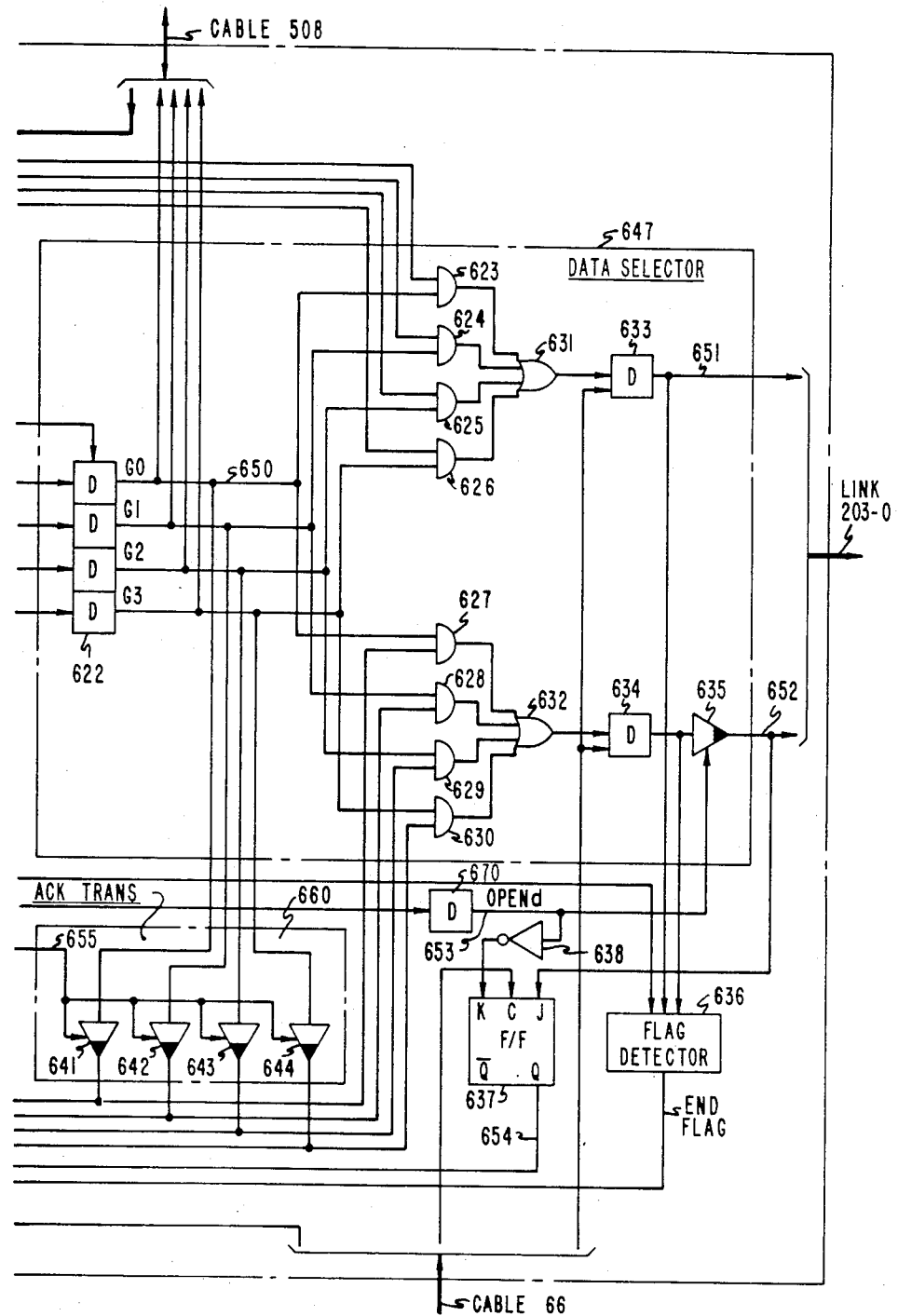

Link control circuit 500 is illustrated in greater detail in FIG. 6 and FIG. 7. Link control 502 is identical in design; however, link control circuits 501 and 503 are different in that the lower inputs of gates 616 through 619 do not have a negative true input since these link control circuits respond to the address bit being a "1".

As illustrated in FIG. 6 and FIG. 7, each link comprises two conductors, for example, link 202-0 comprises conductors 600 and 601. As previously described, each of the four link control circuits within a node can independently be in one of four states: idle, setup, wait, and busy. When the link control circuit is in the busy state, the two conductors in each link both have the function of transferring the data information to the link control circuit. During the busy state, one conductor (even conductor) communicates all even data bits, such as D0, and the other conductor (odd conductor) communicates all odd data bits, such as D1. During the idle, setup, and wait states however, these two conductors within a given link serve different purposes and are designated as the even and odd conductors. For example, within link 202-0, conductor 600 is designated as I00 (even conductor), and conductor 601 is designated as I01 (odd conductor).

Link 202-16 comprises conductors 602 (I10, even conductor) and 603 (I11, odd conductor); link 202-8 comprises conductors 604 (I20, even conductor) and 605 (I21, odd conductor); and link 202-18 comprises conductors 606 (I30, even conductor) and 607 (I31, odd conductor). During the setup state, the originating trunk controller transmits a setup signal for six system clock signals on the even conductor and transmits the address information on the odd conductor for the same period of time.

Figure 8:
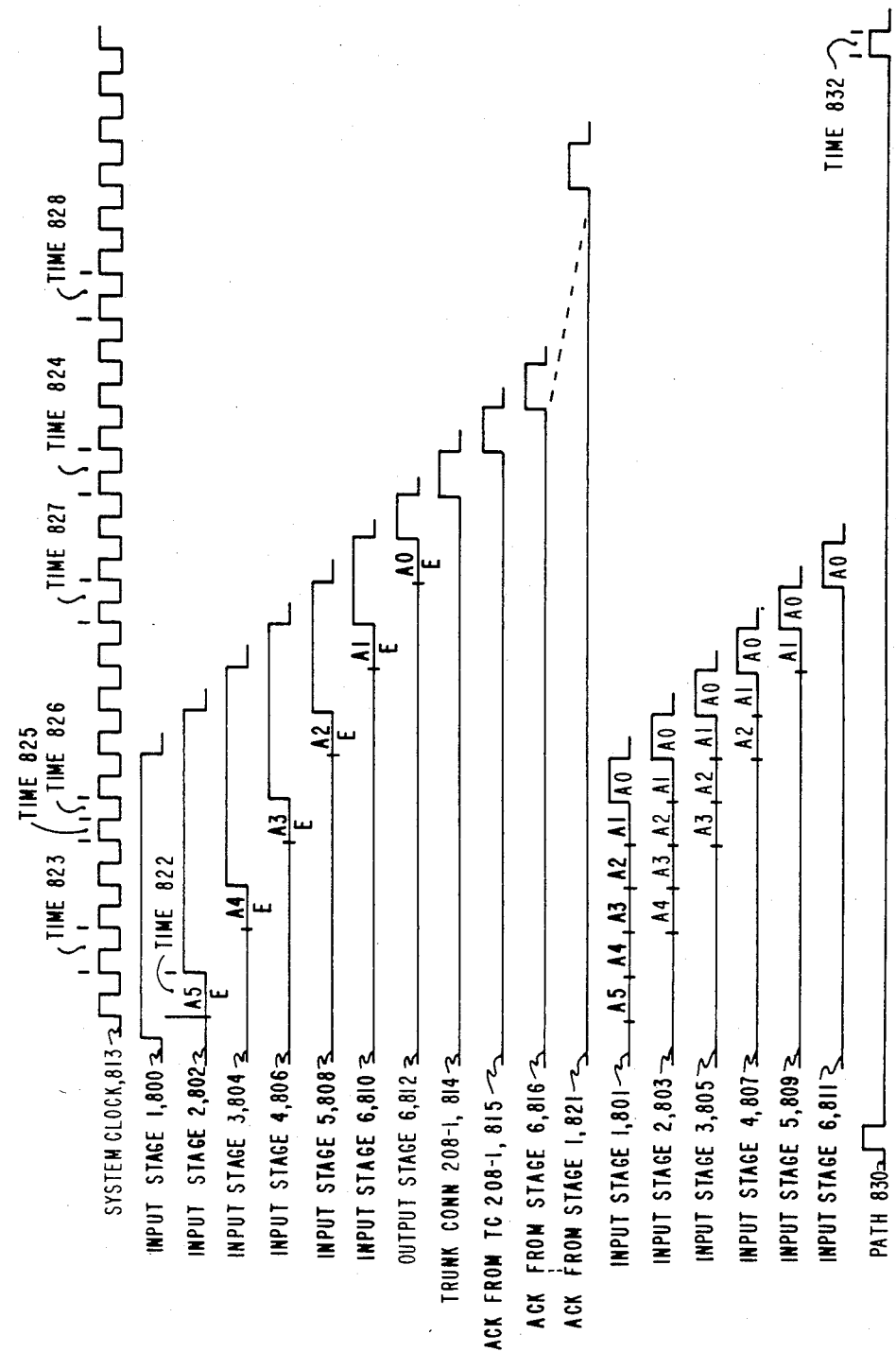
FIG. 8 is a timing diagram indicating the signals utilized during the setup of a path through the switching network illustrated in FIG. 2.

FIG. 8 shows the transmission which takes place between the six stages on the even and odd conductors during the path setup time. As illustrated on line 813, the system clock provides the fundamental timing for the switching nodes in the six stages; and the path signal on line 830 defines the start of path setup time. Initially, trunk controller 207-0 transmits the information shown on lines 800 and 801 to switching node 100-0 via the odd and the even conductors of link 200-0, respectively. During time 822, the address detection circuit of node 100-0 is responsive to the setup signal on line 800 to interrogate the A5 address bit, a "0", that is being received on the odd conductor and is shown as the input to stage 1 on line 801. Switching node 100-0 is properly responsive to this information to transfer any subsequent information received on the odd and even conductor from trunk 207-0 to the selected node in stage 2 starting with time 823. The setup pulse and the address bits are transferred through the stages as illustrated by lines 802 through 812.

As will be described in greater detail later, at each stage, the node removes the most significant address bit. For example, stage 1 removed the A5 address bit. Since the A5 address bit has been removed in stage 1, the receiving node in stage 2 receives the A4 address bit as shown on line 803 simultaneously with the reception of the setup signal as shown on line 802. As shown in line 812, the node in stage 6 which received the information on the odd and even conductors transfers this to trunk controller 208-1 at a time 824. Trunk controller 208-1 is responsive to the setup signal to transfer back on the odd conductor an acknowledge signal. The acknowledge signal then is transferred through all the switching stages back to trunk controller 207-0 as illustrated in lines 815 through 821. When trunk controller 207-0 receives the acknowledge signal via stage 1, it then commences the transmission of the packet data.

Consider now the operation of link control 500 of FIG. 5 as illustrated in FIG. 6 and FIG. 7. Link control circuits 501 through 503 are similar in design, and the differences are pointed out in the following discussion. Controller 621 performs the control functions for link control 500. Address detection block 646 is operational during the setup state to detect the occurrence of the address bit being received from one of the attached links and to ascertain that no other link control in the pair of nodes is currently switching data for that particular link. In addition, address detection block 646 detects the end of the setup state in order to signal controller 621 to transfer to the wait state. Address detection block 646 determines that the setup state is over when it is no longer receiving the setup signal.

Data selection block 647 is utilized to transfer information from a selected link to outgoing link 203-0 of link control 500. Data selection 647 becomes operational during the setup state after the first bit of the address information has been decoded; and the determination is made that link control 500 is to communicate the remainder of the address information and setup signal to link 203-0. Data selection block 647 is also operational during the busy state to transfer the information data from the selected input link to link 203-0. However, during the wait state, data selection block 647 is not active and does not transfer any bits on link 203-0. Since during the wait state, link control 500 is awaiting the acknowledge signal from stage 4 via conductor 652 of link 203-0.

Flag detector 636 is responsive to the receipt of the end flag in the information data to signal controller 621 to enter the idle state. Acknowledge transmission block 660 is utilized by controller 621 to retransmit the acknowledge signal received from stage 4 back to stage 2.

As stated in the previous example, assume that the information shown as line 804 in FIG. 8 is being received on conductor 600 (even conductor) of link 202-0 and that the information shown on line 805 of FIG. 8 is being received on conductor 601 (odd conductor). Further assume, that link control circuit 500 is in the idle state. Link control 500 responds to this information on conductors 600 and 601 during time 825, and link control 502 responds during time 826. This difference in response time avoids contention problems between the link control circuits. In order to determine whether any other link control is responding to information data or path setup information, gate 608 of address detection block 646 monitors signals from the other three link control circuits to ascertain that these circuits are not currently receiving packet data or path setup information on link 202-0. The monitoring is performed by OR gate 608 responding to the state G0 bits of link control 501, 502, and 503 which are transferred to gate 608 via cable 508 from latcher similar to latch 622. If the output of OR gate 608 is a "0", this indicates that the link is not active for the transmission of packet data or path setup information in another link control circuit of the node pair. Since the address bit on conductor 601 is a "0" (A3 as shown on line 805 of FIG. 8), the output of gate 616 transmits a "1" to arbitration circuit 620. A gate similar to gate 616 in link controls 501 and 503 only responds to an address bit A3 being a "1". Arbitration circuit 620's outputs, J0 through J3, respond to its inputs, K0 through K3, as defined by the following equations:

$$J0 = K0$$

$$J = \overline{K0}\, K1$$

$$J2 = \overline{K0}\, \overline{K1}\, K2$$

$$J3 = \overline{K0}\, \overline{K1}\, \overline{K3}\, K3$$

Arbitration circuit 620 is responsive to a "1" received on its K0 input from gate 616 to transmit a "1" to controller 621 via conductor 661. Controller 621 is responsive to a "1" on conductor 661 to leave the idle state and enter the setup state and to set the G0 bit position of latch 622 to a "1". When the G0 bit position is set, a "1" is transmitted via conductor 650 to gates 623 and 627, and the latter are enabled to transfer the subsequent information being received on conductor 600 and 601 to conductors 651 and 652 which are the conductors of output link 203-0 via gate 631, gate 632, flip-flop 633 and flip-flop 634 plus gate 635. In addition, the fact that G0 bit in latch 622 has been set is transmitted via subcable 508 to link control circuits 501, 502, and 503 to indicate that link 202-0 has been selected by link control circuit 500.

The transfer of subsequent information by data selection block 647 continues until time 827. At this time, gate 645 of address detection block 646 senses that link control circuit 500 is no longer receiving the setup signal on conductor 600 and transmits "0" signal indicating this fact to controller 621 via conductor 662. Controller 621 is responsive to receipt of a "0" via conductor 600 to enter the wait state. Upon entering the latter state, controller 621 prepares link control 500 to receive the acknowledge signal from stage 4. Controller 621 transmits the OPENd signal via conductor 653 which disables gate 635 from transmitting on conductor 652 and also resets flip-flop 637.

When the acknowledge signal is received from stage 4 at time 828, flip-flop 637 is set; and its Q output transmits a "1" via conductor 654 to controller 621. In response to a "1" on conductor 654, controller 621 retransmits the acknowledge signal to stage 2 and enters the busy state. Controller 621 retransmits the acknowledge signal to stage 2 by transmitting a "1" via conductor 655 to gates 641 through 644. Since the G0 output is a "1" and this fact is transmitted on conductor 650, gate 641 transmits an acknowledge pulse on conductor 601 back to stage 2. In addition, the OPENd signal enables data selection block 647 to transmit data on conductor 652 by enabling gate 635.

If link control circuit 500 does not receive an acknowledge signal from stage 4 via conductor 652 before time 832 as shown in line 830 of FIG. 8, controller 621 is forced into the idle state by receipt of a signal from OR gate 640 and AND gate 639 upon receipt of the path signal by gate 639. The one reason for an acknowledge signal not being received back from stage 4 is that it was impossible to set up a path to trunk controller 208-1. Forcing controller 621 to the idle state via OR gate 640 and AND gate 639 by the path signal, assures that the controller 621 does not remain in the wait state indefinitely.

While in the busy state, controller 621 transfers any subsequent data received on conductors 600 and 601 to conductors 651 and 652, respectively, while monitoring the data being transferred to detect the end flag. When the end flag is detected by flag detector 636 (which is enabled by the busy signal), a signal indicating this fact is transmitted to controller 621 via OR gate 640. Controller 621 is responsive to the receipt of the end flag indication to enter the idle state.

Figure 9:
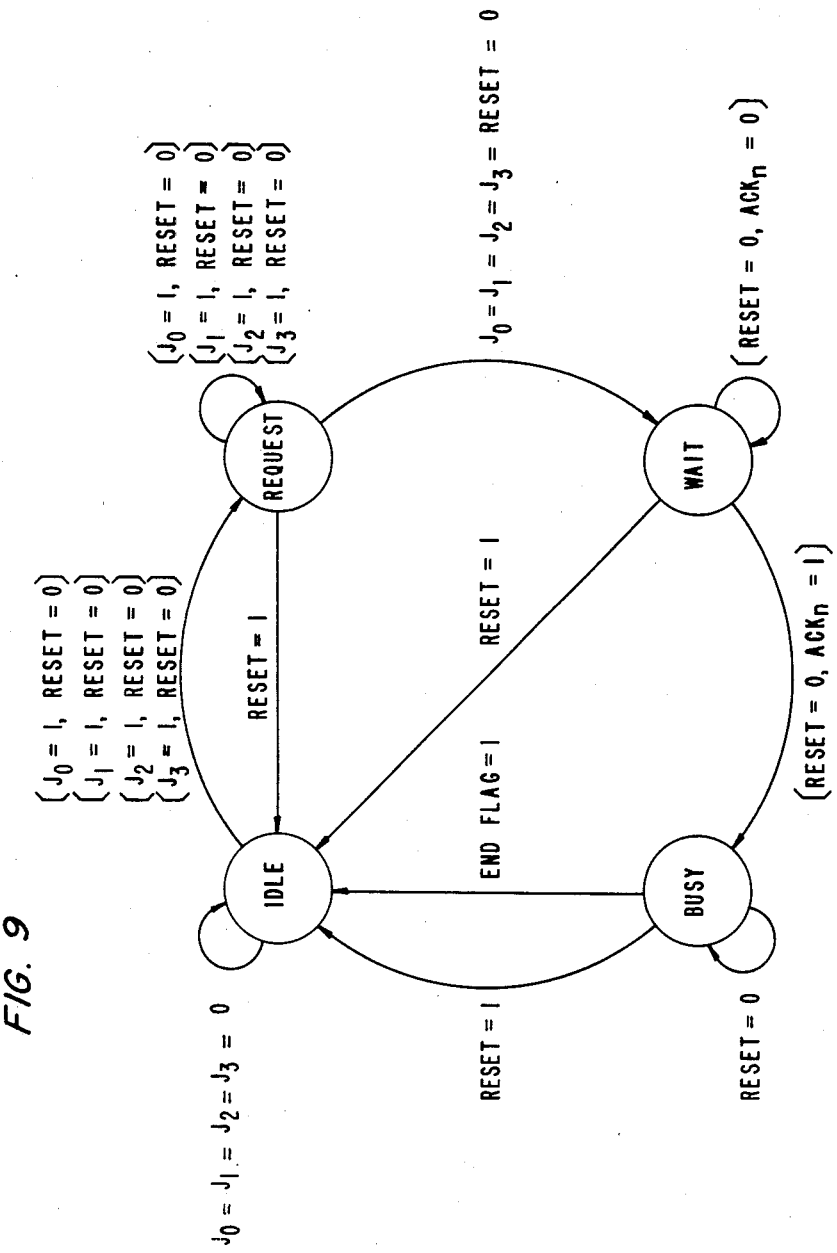
FIG. 9 illustrates the state diagram executed by controller 621 of FIG. 6 during the routing of information through switch node 102-0.

FIG. 9 illustrates the state table for controller 621. The state table as illustrated defines the overall operation of controller 621 in detail.

Figure 10:
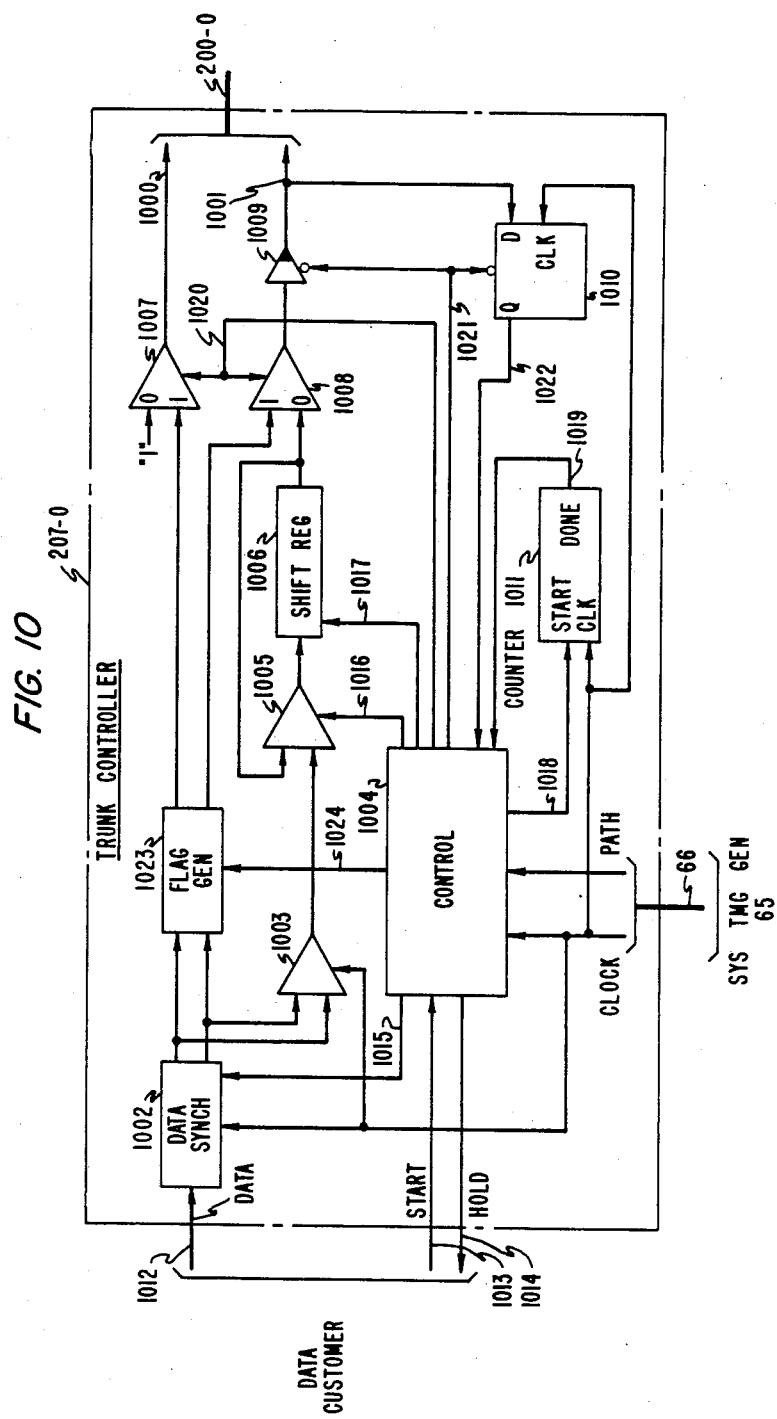
FIG. 10 illustrates, in block diagram form, trunk controller 207-0 of FIG. 2.

Trunk controller 207-0 is illustrated in FIG. 10. Trunk controller 207-0 is responsive to data received from a data customer to transmit this data to the switching network illustrated in FIG. 2. When the data customer has data for transmission, the data customer transmits to control 1004 the start signal via 1013. Control 1004 is responsive to the start signal to transmit the hold signal via conductor 1014 to the data customer and to route the subsequent data transmitted by the data customer via cable 1012 through data synchronization circuit 1002, parallel to serial converter 1003, and data selector 1005 to shift register 1006. Control 1004 initializes this path by transmitting the appropriate signals on conductors 1015, 1016, and 1017. Also, control 1004 starts counter 1011 to count six bit times which represent the six address bits received from the data customer being transferred into shift register 1006. After the six address bits have been stored in shift register 1006, control 1004 transmits the hold signal to the data customer via conductor 1014. The transmission of a "1" on conductor 1019 to control 1004 by counter 1011 informs control 1004 that the six address bits have been stored in shift register 1006. At this point, control 1004 is in a wait state until system timing generator 65 generates the path signal. Upon receipt of the path signal, control 1004 conditions data selector 1007 and 1008 to accept data from their "0" inputs and transfers the address bits stored in shift register 1006 through data selector 1008 to link 200-0 via gate 1009 and conductor 1001. At the same time, since data selector 1007 is selecting its "0" input, and a "1" signal is transmitted out on conductor 1000, and the latter is the previously described setup signal.

After the six address pulses have been transmitted out as determined by counter 1011, control 1004 disables gate 1009 which enables flip-flop 1010 and awaits the response of the acknowledge pulse back on conductor 1001. Upon receipt of the acknowledge pulse, control 1004 transmits a signal via conductor 1014 informing the data customer that transmission of data can continue. After the data customer has finished transmission of either a packet or the circuit switched data, the data customer ceases to transmit the start signal via conductor 1013. In response to the absence of the start signal, control 1004 transmits a signal to flag generator 1023 via conductor 1024 that causes flag generator 1023 to transmit the end flag bits via data selectors 1007 and 1008 and conductors 1000 and 1001, respectively. In response to this end flag, the nodes in the path release the path.

Figure 3:
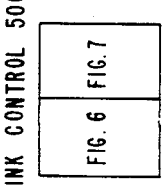
FIG. 3 illustrates how certain of the figures may be combined.
Figure 11:
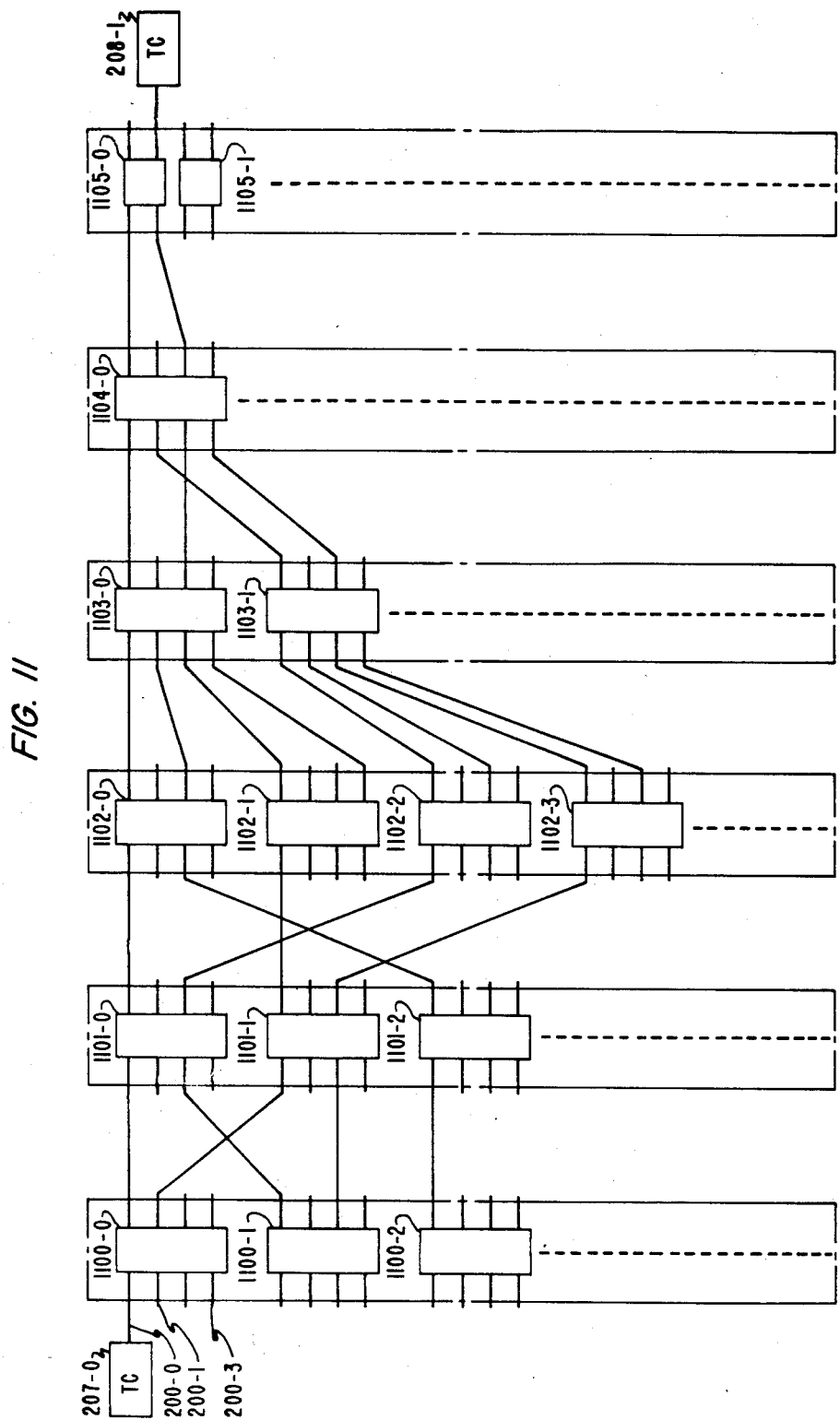
FIG. 11 illustrates, in block diagram form, the reconfiguration of the network illustrated in FIG. 2.

In order to adapt the architecture of FIG. 3 for the utilization of very large scale integration (VLSI), it is necessary to perform a topological transformation of the architecture illustrated in FIG. 3 such that all of the pairs of switching nodes physically occupy a physical position next to one another. The topological transformation of FIG. 3 is illustrated in FIG. 11 with pairs of nodes being shown as a single element. The designation is such that the numeric designation of these elements corresponds to the lowest numerical designation of the first switching node of FIG. 3. For example, in stage 3 of FIG. 3, the switching node pair 102-0 and 102-4 is designated on FIG. 12 as 1102-0, and in the second stage of FIG. 3, the switching pair 101-1 and 101-3 is designated 1101-1. The topological transformation is formally defined as follows. Since the network has been transformed so that two switching nodes that share traffic are together, the shuffling function, $S_i$, to perform this operation on the $i_{th}$ stage nodes of FIG. 3 after shuffling the new position of the link $|P_{n-1} \ldots P_i P_{i-1} \ldots P_2 P_1 P_0|$ is defined as $$S_i||P_{n-1} \ldots P_{i+1} P_i P_{i-1} \ldots P_2 P_1 P_0|| =$$

$$|P_{n-1} \ldots P_{i+1} P_{i-1} \ldots P_2 P_1 P_i P_0|$$

where $i = 2, 3, \ldots n/2$

Let $S_i^{-1}$ be the inverse function of $S_i$ then $$S_i^{-1}||P_{n-1} \ldots P_{i+1} P_i P_{i-1} \ldots P_2 P_1 P_0|| =$$

$$|P_{n-1} \ldots P_{i+1} P_1 P_i P_{i-1} \ldots P_2 P_0|$$

Define $T_i$ as follows $$T_i||P_{n-1} \ldots P_{i+1} P_i P_{i-1} \ldots P_2 P_1 P_0|| =$$

$$|P_{n-1} \ldots P_{i+1} P_0 P_{i-1} \ldots P_2 P_1 P_i|$$

$D_i$ is the topological describing rule that defines the way links of the $i_{th}$-stage nodes are connected to the links of the $(i+1)_{th}$ stage nodes and $D_i = T_{n-i}$. The topology of FIG. 3 is given by $S_{i+1} D_i S_i^{-1}$.

It is to be understood that the above-described embodiment is merely illustrative of the principles of this invention; other arrangements may be devised by those skilled in the art without departing from the spirit and scope of the invention. In particular, one skilled in the art could readily observe that for the case where $i > m/2$ (m equals the number of stages in the network and i equals the stage number) that the nodes within a given section of the ith stage can be paired in any manner.

What is claimed is:

1. An alternate-path, self-routing, packet and circuit switching system for switching packets for a plurality of messages and circuit switched information from a plurality of digital data units, said system comprising:

a switching network having a plurality of stages each comprising sets of a plurality of switch nodes;

a plurality of distributed controllers each for interfacingly connecting an individual one of said digital data units to one set of said switch nodes;

each of said controllers responsive to a received one of said packets and a start of circuit information for transmitting address signals to establish a path through said switching network;

each switching node of a set of said switch nodes of one stage being interconnected to another set of switch nodes in the next sequential stage; and one switch node of a set of said switch nodes responsive to receipt of said address signals for setting up said path via another one of said set of switch nodes in said next sequential stage.

2. The system of claim 1 wherein each of said packets comprises an end flag field containing signals indicating the end of the packet; and each set of said switch nodes comprises means responsive to the receipt of the end signals for removing said path through said switching network.

3. The system of claim 1 wherein each of said controllers comprises means for transmitting end signals upon the completion of the communication of said circuit switched information; and each of said switch nodes comprises means responsive to the receipt of the end signals for removing said path through said switching network.

4. The system of claim 3 wherein said one of said set of said switch nodes further comprises means for designating another one of said other set of switch nodes in said sequential stage in response to said address information;

means responsive to a communication unavailable signal from said designated other one of said other set for entering an idle state; and said one of said set of said nodes further comprises means responsive to said communication unavailable signal for transmitting another communication unavailable signal to the last preceding stage.

5. The system of claim 4 wherein said one of said set of said switch nodes further comprises means responsive to receipt of said address signals for transmitting an input link busy signal to the other switch nodes of said set containing said receiving switching node; and said other switch nodes of said set responsive to receipt of said input link busy signal for entering an inactive state with respect to said path.

6. The system of claim 5 wherein said receiving one of said set of said switch node further comprises means responsive to said address signals to eliminate the most significant address signals and to retransmit the remaining address signals to the next sequential stage.

7. A self-routing switching network for communicating information messages in response to address routing information from network input ports to network output ports, said network comprising:

a plurality of switching stages interconnected by transmission links;

each of said stages comprising sets of a plurality of switch nodes with all nodes of one individual set of nodes being connected to all links of one individual set of said links from a preceding stage for distributing the communication messages received on said set of links throughout said switching network so that the traffic capacity and reliability of said network is increased; and one of a set of nodes responsive to said address routing information on one of said links of said set of links for establishing a path through said switching network.

8. The switching network of claim 7 wherein said set of nodes comprises two nodes and the configuration of said set of nodes is defined by complementing bit positions of a binary number representing the stage position of said one of said nodes of said set to obtain another binary number representing the stage position of the other node of said set.

9. The switching network of claim 7 wherein said set of nodes comprises two nodes and the configuration of said set of nodes is defined by a pair of binary numbers each representing the position of an individual node in said stage;

one of said numbers represents the position of said one node of said set of said stage;

another of said numbers representing the position of the other node of said set defined by complementing the bit position of said one of said numbers equal to the stage number of said stage where the stage number is less than or equal to half the total number of stages in said network; and said other of said numbers defined by complementing the least significant bit position of said one of said numbers where said stage number is greater than half of said total number of stages.

10. The switching network of claim 7 wherein said set of nodes comprises two nodes and the configuration of said set of nodes is defined by a pair of binary numbers each representing the position of an individual node in said stage;

one of said numbers represents the position of said one node of said set of said stage;

another of said numbers representing the position of the other node of said set defined by complementing the bit position of said one of said numbers equal to half the total number of stages minus the stage number plus one where the stage number is less than or equal to half the total number of stages in said network; and said other of said numbers defined by complementing the least significant bit position of said one of said numbers where said stage number is greater than half of said total number of stages.

11. An alternate path, self-routing, packet and circuit switching system for switching packets for a plurality of messages and circuit switched information from a plurality of digital data units, said system comprising a plurality of switching stages;

a plurality of transmission links interconnecting said stages;

each of said stages comprising sets of a plurality of switch nodes;

all nodes of one individual set of nodes being connected to all links of one individual set of said links from a preceding stage for distributing said packets and circuit switched information received on said set of links throughout said switching network so that the traffic capacity and reliability of said network is increased;

a subset of said set of nodes responsive to said address routing information of one of said links of said set of links for establishing a path through said switching network; and said subset of said set of nodes responsive to end signals contained in one of said packets for removing said path through said switching network.

12. The invention of claim 11 wherein said system further comprises a plurality of distributed controllers each for interfacingly connecting an individual one of said digital data units to one of said switch nodes;

each of said controllers comprises means for transmitting end signals upon the completion of said circuit switched information; and each of said switch nodes responsive to the receipt of the end signals for removing said path through said switching network.

13. The system of claim 12 wherein each set of nodes comprises two nodes and the configuration of said set of nodes is defined by complementing bit positions of a binary number representing the stage position of one of said nodes of said set to obtain another binary number 14. The switching system of claim 12 wherein each of said sets of nodes comprises two nodes and the configuration of said sets of nodes is defined by a pair of binary numbers each representing the position of an individual node in said set;

one of said numbers representing the position of one node of said set of a stage;

another of said numbers representing the position of the other node of said set defined by complementing the bit position of said one of said numbers equal to the stage number of said stage where the stage number is less than or equal to half the total number of stages in said network; and said other of said numbers defined by complementing the least significant bit position of said one of said numbers where said stage number is greater than half of said total number of stages.

15. The switching system of claim 12 wherein each of said sets of nodes comprises two nodes and the configuration of said sets of nodes is defined by a pair of binary numbers each representing the position of an individual node in said set;

one of said numbers representing the position of one node of said set of a stage;

another of said numbers representing the position of the other node of said set defined by complementing the bit position of said one of said numbers equal to half the total number of stages minus the stage number plus one where the stage number is less than or equal to half the total number of stages in said network; and said other of said numbers defined by complementing the least significant bit position of said one of said numbers where said stage number is greater than half of said total number of stages.

16. A method of switching packets and circuit switched information through a switching network comprising a plurality of switching stages interconnected by transmission links, each of said stages comprising sets of a plurality of switch nodes with all nodes of one individual set of said switch nodes being connected to all links of one individual set of said links from a preceding stage, and comprises the steps of:

transmitting routing information on one of said links of said set of links to establish a path through said switching network;

selecting one of a multitude of paths through said network by one of a set of said switch nodes responding to said address routing information to transfer said address routing information to another set of switch nodes in the next sequential stage.

17. The method of claim 16 wherein said switching network further comprises distributed controllers interconnecting digital data units to said switching network and said set further comprises the steps of one of said controllers transmitting end signals upon all circuit switched information having been transmitted; and disenabling said path by each of said switch nodes upon receipt of said end signals.

18. The method of claim 16 wherein said selecting steps further comprises the steps of transmitting an input link busy signal to the other switch nodes of said set by said one of said set of said switch nodes;

entering an idle state with respect to said path by said other switching nodes in response to receipt of said input link busy signal; and establishing said path to the next sequential stage by said one of said set of said switch nodes.

* * * * *